United States Patent
Shimizuike et al.

(10) Patent No.: US 12,407,529 B2
(45) Date of Patent: Sep. 2, 2025

(54) SERVER, INFORMATION MANAGEMENT SYSTEM, AND INFORMATION MANAGEMENT METHOD

(71) Applicant: TOYOTA JIDOSHA KABUSHIKI KAISHA, Toyota (JP)

(72) Inventors: Noboru Shimizuike, Tokyo (JP); Hitoshi Murakami, Tokyo (JP); Jiro Iwasaki, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 117 days.

(21) Appl. No.: 18/398,880

(22) Filed: Dec. 28, 2023

(65) Prior Publication Data

US 2024/0297798 A1 Sep. 5, 2024

(30) Foreign Application Priority Data

Feb. 8, 2023 (JP) .................................. 2023-017422

(51) Int. Cl.
*H04L 9/32* (2006.01)
*H04L 9/00* (2022.01)
*H04L 9/08* (2006.01)

(52) U.S. Cl.
CPC ............ *H04L 9/3268* (2013.01); *H04L 9/007* (2013.01); *H04L 9/0825* (2013.01); *H04L 9/3247* (2013.01)

(58) Field of Classification Search
CPC ..... H04L 9/3268; H04L 9/007; H04L 9/0825; H04L 9/3247
USPC ....................................................... 713/175
See application file for complete search history.

(56) References Cited

U.S. PATENT DOCUMENTS

| | | | |
|---|---|---|---|
| 10,057,243 B1* | 8/2018 | Kumar | H04L 9/0891 |
| 11,082,233 B2* | 8/2021 | Yang | H04L 9/3234 |
| 2016/0210621 A1* | 7/2016 | Khan | G06T 1/0028 |
| 2017/0230353 A1* | 8/2017 | Kurian | G06Q 20/40 |
| 2023/0259918 A1* | 8/2023 | Rao | G06Q 20/4014 705/67 |
| 2023/0269095 A1* | 8/2023 | Yamaoka | H04L 9/006 713/176 |

FOREIGN PATENT DOCUMENTS

| | | |
|---|---|---|
| JP | 2018-537022 A | 12/2018 |
| WO | 2017066715 A1 | 4/2017 |

OTHER PUBLICATIONS

Manu Sporny, MW3C Recommendation Nov. 19, 2019, Verifiable Credentials Data Model 1.0, 2019 (Year: 2019).*

(Continued)

*Primary Examiner* — Samson B Lemma
(74) *Attorney, Agent, or Firm* — Sughrue Mion, PLLC

(57) ABSTRACT

A server includes: a communication device configured to communicate with a communication terminal of a holder; and a processor. The processor is configured to issue a verifiable credential in response to an issuance request signal received from the communication terminal. The issuance request signal is a signal requesting issuance of the verifiable credential, and contains attribute information of the holder and a first decentralized identifier that is a decentralized identifier of the holder. The processor is configured to set a validity period for the verifiable credential based on the attribute information of the holder. The processor is configured to associate the set validity period with the first decentralized identifier.

4 Claims, 16 Drawing Sheets

(56) References Cited

OTHER PUBLICATIONS

T. Lodderstedt, OpenID for Verifiable Credential Issuance, openid-4-verifiable-credential-issuance-1_0-09, Oct. 27, 2022 (Year: 2022).*

* cited by examiner

CONFIRM IDENTITY INFORMATION

INFORMATION/PHOTO ENTERED WILL BE REGISTERED ON APP.

NAME | REQUIRED

LAST NAME | FIRST NAME

YAMADA | TARO

ZIP CODE | REQUIRED 123-4567

HOME ADDRESS | REQUIRED

..., TOKYO

DOB | REQUIRED

19YY/MM/DD

HOME | CERTIFICATE/VC LIST | SETTINGS

SERVER, INFORMATION MANAGEMENT SYSTEM, AND INFORMATION MANAGEMENT METHOD

CROSS-REFERENCE TO RELATED APPLICATION

This application claims priority to Japanese Patent Application No. 2023-017422 filed on Feb. 8, 2023, incorporated herein by reference in its entirety.

BACKGROUND

1. Technical Field

The present disclosure relates to information management systems and information management methods.

2. Description of Related Art

In recent years, decentralized identity has attracted attention. The decentralized identity is a system in which holders have full control over their attribute information and share necessary information out of the attribute information with others within the range permitted by the holders. In the decentralized Identity, verifiable credentials (VCs) issued by issuers are associated with decentralized Identifiers (DIDs) of holders. The holders can use services provided by verifiers by presenting their VCs to the verifiers. An example of such a system and method is disclosed in Japanese Unexamined Patent Application Publication No. 2018-537022 (JP 2018-537022 A).

SUMMARY

Technologies such as electronic signatures have been generally introduced to reduce the risk of fraudulent use of VCs (such as falsification of VCs). However, as encryption technology advances, the risk of fraudulent use of VCs may increase. There is a need to strengthen a system for reducing the risk of fraudulent use of VCs.

The present disclosure provides a server, information management system, and information management method that reduce the risk of fraudulent use of VCs.

A server according to a first aspect of the present disclosure includes: a communication device configured to communicate with a communication terminal of a holder; and a processor. The processor is configured to issue a verifiable credential in response to an issuance request signal received from the communication terminal. The issuance request signal is a signal requesting issuance of the verifiable credential, and contains attribute information of the holder and a first decentralized identifier that is a decentralized identifier of the holder. The processor is configured to set a validity period for the verifiable credential based on the attribute information of the holder. The processor is configured to associate the set validity period with the first decentralized identifier.

In the above configuration, when the validity period expires, the server reissues (renews) the verifiable credential in response to another issuance request from the communication terminal. This allows an electronic signature generated by the latest encryption technology to be contained in the verifiable credential. The risk of fraudulent use of the verifiable credential can thus be reduced.

In the server according to the first aspect of the present disclosure, the attribute information may contain information entered by the holder and information on an identity verification document of the holder. The processor may be configured to issue the verifiable credential when identity verification of the holder is successfully completed by checking the information entered by the holder against the information on the identity verification document.

According to the above configuration, the verifiable credential can be issued after successful verification of the identity of the holder.

In the server according to the first aspect of the present disclosure, the processor may be configured to determine, based on the attribute information of the holder, which group the holder belongs to out of a plurality of groups with different levels of credibility. The processor may be configured to set the validity period longer when the holder belongs to the group with a high level of credibility than when the holder belongs to the group with a low level of credibility.

In the above configuration, the validity period is set short when the holder's level of credibility is low. Therefore, the validity period expires early, and the renewal frequency of the verifiable credential is increased. It is also possible to verify the identity of the holder with a low level of credibility again when renewing the verifiable credential. Accordingly, the risk of fraudulent use of the verifiable credential can further be reduced.

An information management system according to a second aspect of the present disclosure includes: the server according to the first aspect; and a verifier server configured to verify the verifiable credential from the communication terminal.

In the information management system according to the second aspect of the present disclosure, the server and the verifier server may be configured to access a decentralized ledger network including a decentralized ledger. The server may be configured to register a public key corresponding to a private key on the decentralized ledger. The verifiable credential may contain a second decentralized identifier that is a decentralized identifier of the server and an electronic signature generated using the private key. The verifier server may be configured to, when the verifier server receives the verifiable credential from the communication terminal, acquire the public key from the decentralized ledger based on the second decentralized identifier contained in the verifiable credential, and verify the electronic signature using the public key.

An information management method according to a third aspect of the present disclosure is performed by a server. The information management method includes issuing a verifiable credential in response to an issuance request signal received from a communication terminal of a holder. The issuance request signal is a signal requesting issuance of the verifiable credential, and contains attribute information of the holder and a decentralized identifier of the holder. The issuing includes setting a validity period for the verifiable credential based on the attribute information of the holder, and associating the validity period with the decentralized identifier.

According to the above configuration, the risk of fraudulent use of the verifiable credential can be reduced.

According to the present disclosure, the risk of fraudulent use of VCs can be reduced.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 7 is a second diagram showing an example of an image displayed on the holder terminal:

DETAILED DESCRIPTION OF EMBODIMENTS

Hereinafter, an embodiment of the present disclosure will be described in detail with reference to the drawings. The same or corresponding portions are denoted by the same signs throughout the drawings, and description thereof will not be repeated.

EMBODIMENT

Overall Configuration

Figure 1:
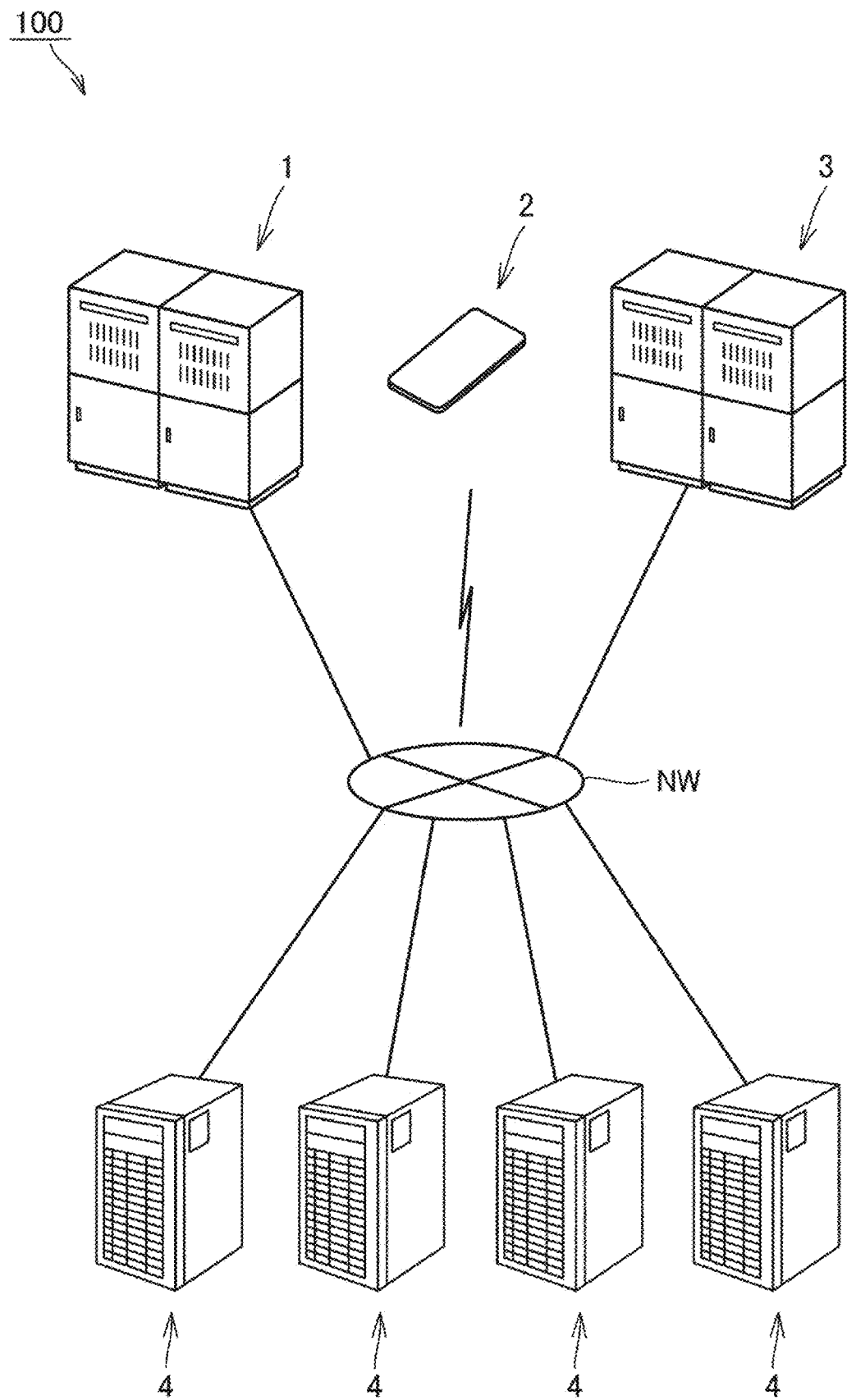
FIG. 1 shows an overall configuration of an information management system according to an embodiment of the present disclosure.

FIG. 1 shows an overall configuration of an information management system according to an embodiment of the present disclosure. The information management system 100 is configured to manage information using decentralized identities (decentralized identifiers (DIDs)). The information management system 100 includes an issuer server 1, a holder terminal 2, a verifier server 3, and a plurality of nodes 4. The components of the information management system 100 are connected via a network NW such as the Internet so that they can communicate with each other.

The issuer server 1 is a server run by an issuer of verifiable credentials (VCs). The VC issuer is desirably an entity (such as a financial institution) that has the ability and experience to perform identity verification. The VC issuer may be an administrative agency. The issuer server 1 is an example of the "server" according to the present disclosure.

The holder terminal 2 is a communication terminal that is operated by a holder (user having attribute information). The holder terminal 2 is typically a mobile terminal. Examples of the mobile terminal include a smartphone, a tablet, a notebook personal computer (PC), and a wearable device (such as a smartwatch). The holder terminal 2 may be a stationary terminal such as a desktop PC. The holder terminal 2 is an example of the "communication terminal" according to the present disclosure. The holder terminal 2 is installed with software for executing various processes (described later) related to a DID (this software is hereinafter referred to as "wallet application").

The verifier server 3 is a server run by a VC verifier. The VC verifier is a company or entity that provides a service to holders. The type of service is not particularly limited, but the VC verifier is, for example, an insurance company (such as a life insurance company).

The nodes 4 manage the DIDs using public decentralized ledger technology. An example in which a blockchain is used will be described below. Blockchain-based software is installed in each node 4. A blockchain network is formed by the nodes 4 communicating with each other via a network. The decentralized ledger technology is not limited to the blockchain, but may be other types of decentralized ledger technology such as CORDA (registered trademark). Decentralized public key infrastructure (DPKI) software is also installed in the nodes 4. As will be described later, the nodes 4 receive registration of a public key from the issuer server 1 or the holder terminal 2 and provide a public key to the verifier server 3.

For simplicity, FIG. 1 shows only one issuer server 1, one holder terminal 2, one verifier server 3, and four nodes 4. However, the information management system 100 may include any numbers of issuer servers 1, holder terminals 2, verifier servers 3, and nodes 4. There may be a large number of holder terminals 2. The number of nodes 4 forming the blockchain network is typically greater than the number of nodes 4 shown in the figure. The issuer server 1 and/or the verifier server 3 may have a node function and may form part of the blockchain network.

Figure 2:
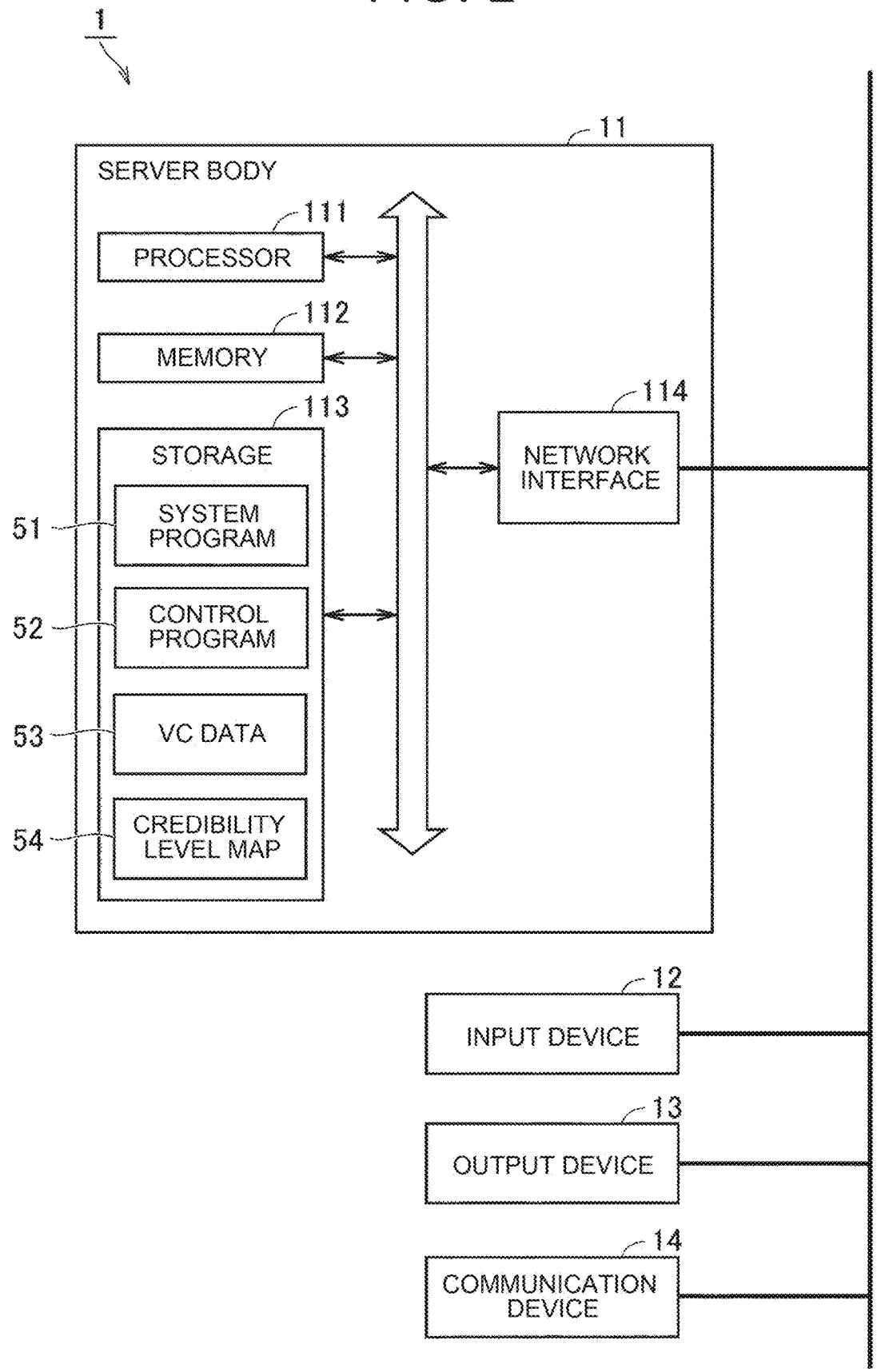
FIG. 2 is a block diagram showing a typical configuration example of an issuer server.

FIG. 2 is a block diagram showing a typical configuration example of the issuer server 1. The issuer server 1 includes an arithmetic processing unit (server body) 11, an input device 12, an output device 13, and a communication device 14. The arithmetic processing unit 11 includes a processor 111, a memory 112, a storage 113, and a network interface 114. The components of the issuer server 1 are connected by a communication bus so that they can communicate with each other.

The processor 111 is, for example, a central processing unit (CPU) or a micro-processing unit (MPU). The memory 112 is a volatile memory such as a random access memory (RAM). The storage 113 is a rewritable nonvolatile memory such as a hard disk drive (HDD), a solid state drive (SSD), or a flash memory. The storage 113 stores a system program 51 including an operating system (OS), a control program 52 including computer-readable codes necessary to perform control calculations, VC data 53 on VCs of many holders, and a credibility level map 54 (described later). A storage area for the VC data 53 is also called an identity hub.

The processor 111 implements various processes by reading the system program 51 and the control program 52, loading them into the memory 112, and executing them. The network interface 114 controls data communication between the issuer server 1 (arithmetic processing unit 11) and other devices (such as the holder terminal 2 and the nodes 4) via the communication device 14.

In the present specification, the "processor" is not limited to a narrowly defined processor that executes processes by a stored program method, and may include hardwired circuitry such as an application specific integrated circuit (ASIC) and a field-programmable gate array (FPGA). Therefore, the term "processor" may be used interchangeably with processing circuitry whose processes are defined in advance by computer readable codes and/or hardwired circuitry.

The input device 12 is a keyboard, a mouse, etc. and receives input operations from an operator (such as an employee of the issuer). The output device 13 is, for example, a display, and outputs various types of information (such as process results) to the operator. The communication device 14 is configured to communicate with the external network NW such as the Internet.

The holder terminal 2 and the verifier server 3 basically have the same configuration as the issuer server 1 except for data (programs, maps, etc.) stored in the storage 113. Therefore, detailed description of the configurations of the holder terminal 2 and the verifier server 3 will not be repeated.

Decentralized Identity

Figure 3:
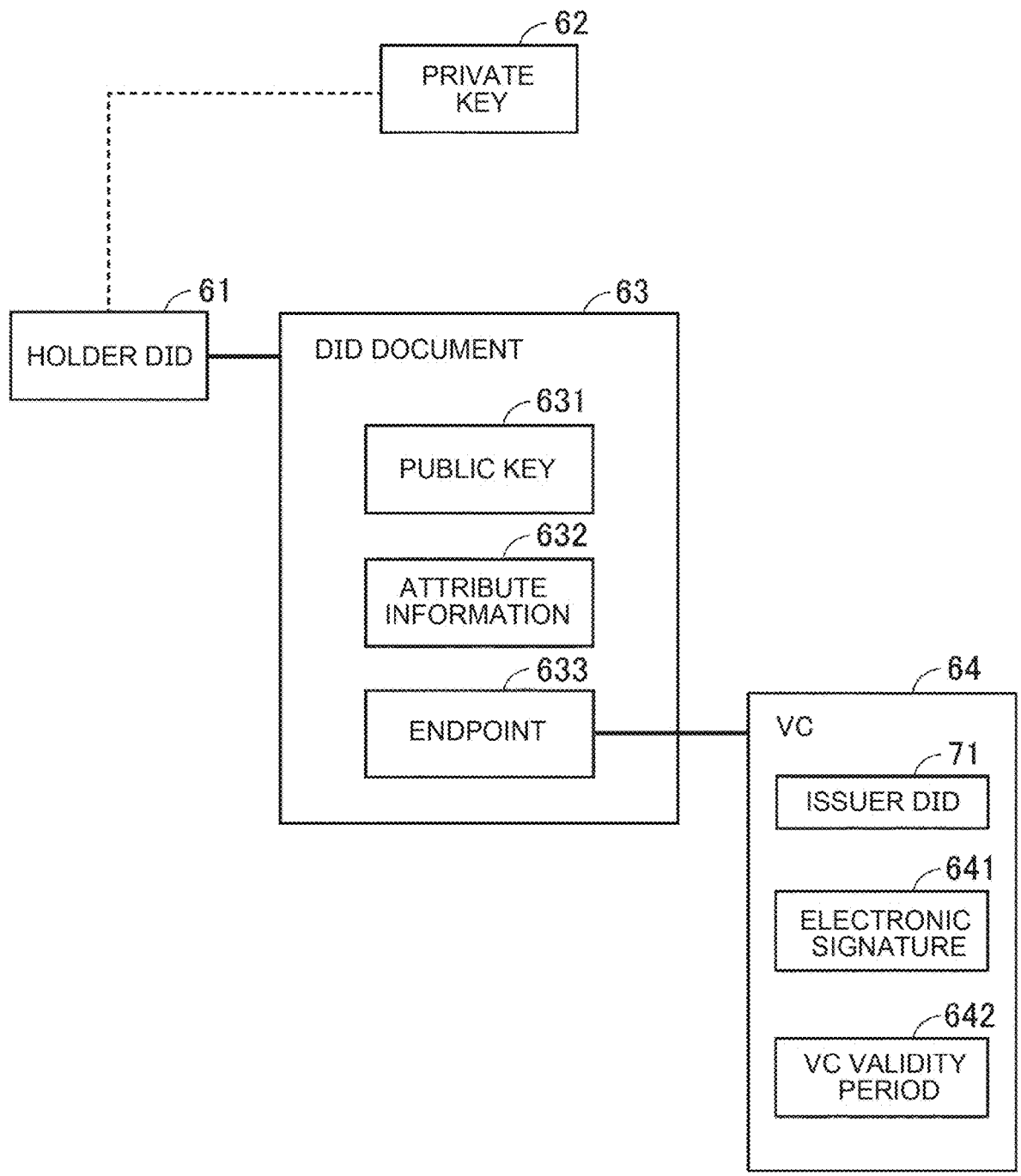
FIG. 3 is a conceptual diagram illustrating association between pieces of information in a decentralized identity.

FIG. 3 is a conceptual diagram illustrating association between pieces of information in a decentralized identity of a holder. As described above, a decentralized identifier (DID) 61 is an identifier for managing a decentralized identity of a holder. The DID 61 is hereinafter referred to as "holder DID."

When the holder DID is issued, a private key 62 is assigned and associated with the holder DID. The private key 62 is managed by the holder (wallet application in the holder terminal 2) who is the issuer and owner of the holder DID.

A DID document 63 is also associated with the holder DID. The DID document 63 is metadata. The DID document 63 contains a public key 631 corresponding to the private key 62, attribute information 632 of the holder, and an endpoint 633 for accessing a verifiable credential (VC) 64. The holder DID and the DID document 63 are registered on a blockchain.

The attribute information 632 may be classified into two types: required items that are required to be entered by the holder, and optional items that can be optionally entered by the holder. The required items include, for example, name, address, date of birth (DOB), phone number, e-mail address, and identity verification document information (driver's license information, passport information, etc.). The optional items include, for example, bank account information, nationality, place of birth (or may be location of family register), individual number card information (individual number, social security number, taxpayer number, etc., depending on the country), history of overseas residence, carrier history (occupation), and educational background. It should be noted that the above classification between the required and optional items is merely illustrative.

Figure 4:
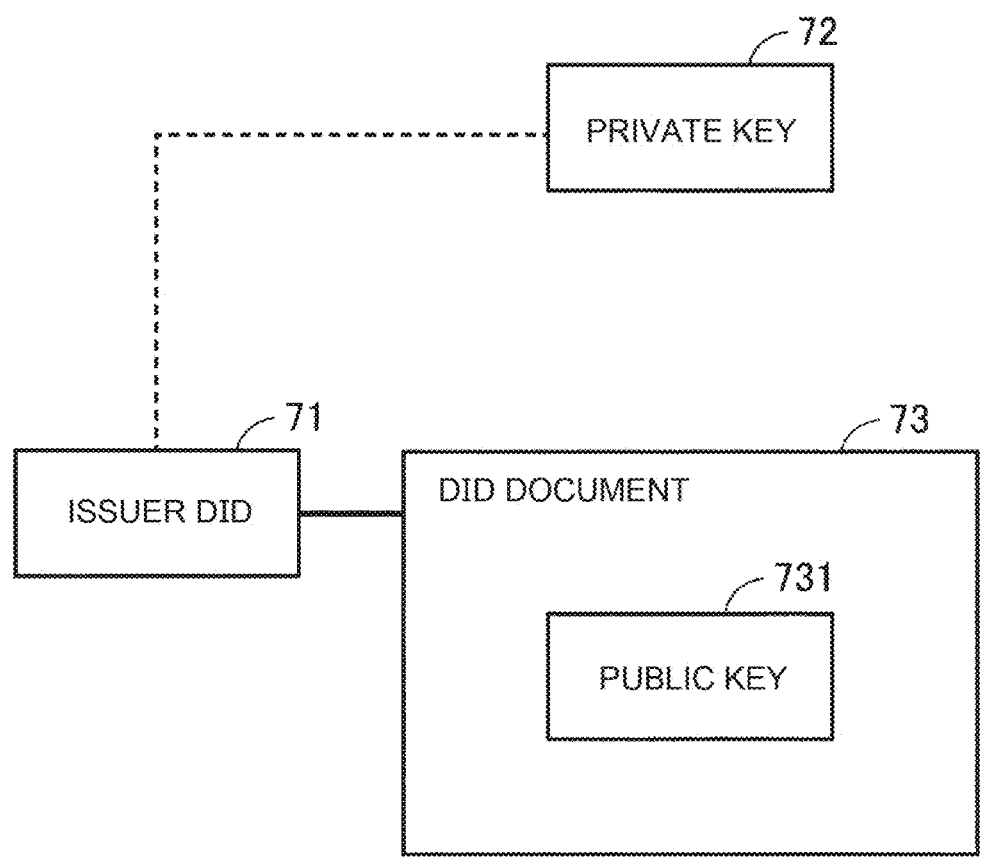
FIG. 4 is a conceptual diagram illustrating association between pieces of information in a decentralized identifier (DID) issued by the issuer server.

FIG. 4 is a conceptual diagram illustrating association between pieces of information in a DID issued by the issuer server 1. A DID 71 is a decentralized identifier of the issuer server 1. In order to distinguish the DID 71 from the holder DID, the DID 71 is hereinafter referred to as "issuer DID." A private key 72 and a DID document 73 are associated with the issuer DID. The DID document 73 contains a public key 731 corresponding to the private key 72. The issuer DID and the DID document 73 (public key 731) are also registered on the blockchain.

The holder DID is an example of the "first decentralized identifier" according to the present disclosure. The issuer DID is an example of the "second decentralized identifier" according to the present disclosure.

VC

Figure 5:
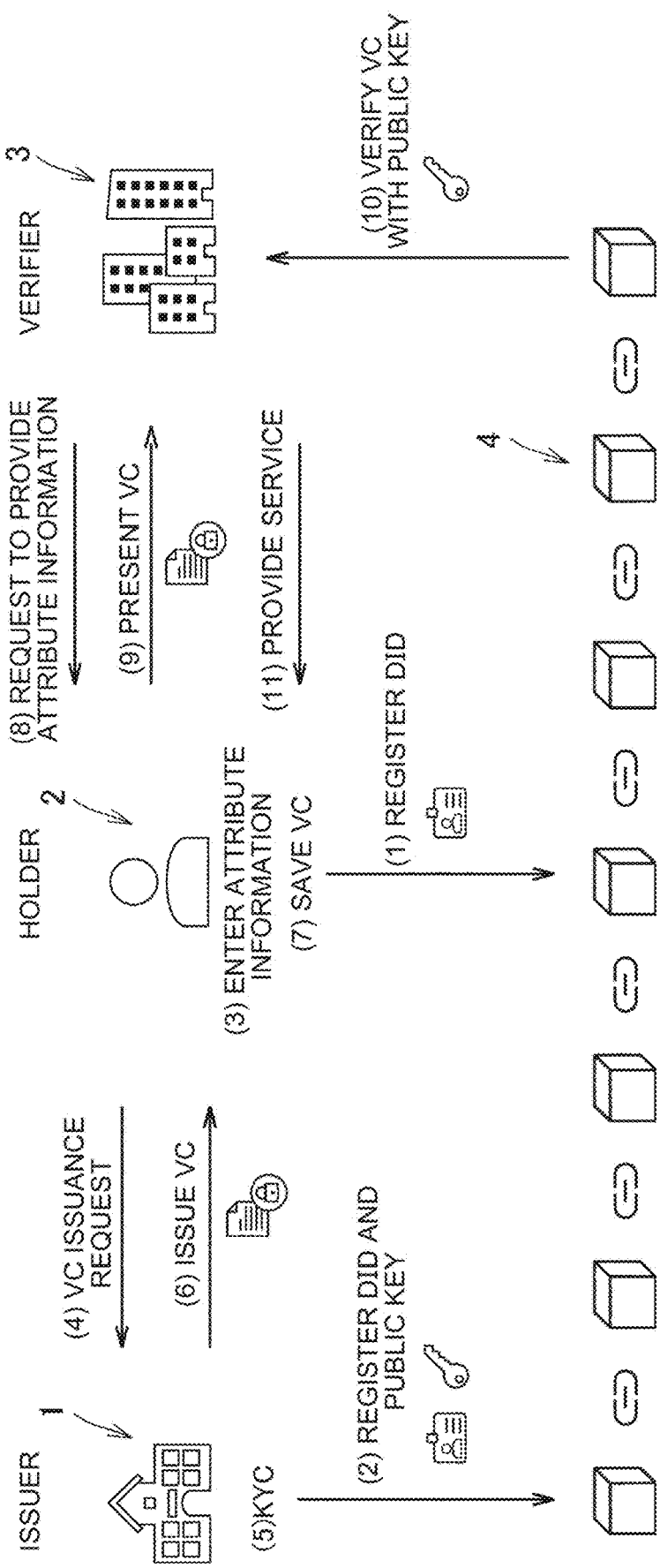
FIG. 5 is a conceptual diagram illustrating an outline of a series of steps related to a verifiable credential (VC) in the information management system.

FIG. 5 is a conceptual diagram illustrating an outline of a series of steps related to the VC 64 in the information management system 100. The numbers in parentheses below correspond to the numbers in parentheses shown in the figure. FIGS. 6 to 14 show examples of images that are displayed on the holder terminal 2 in each step. In the following description, the series of steps is divided into three phases: a DID registration phase, a VC issuance phase, and a VC use phase.

DID Registration Phase (1) Register DID

The holder terminal 2 issues a holder DID and registers the holder DID and the DID document 63 on the blockchain. The DID document 63 contains the public key 631 and the holder's attribute information 632 (see FIG. 3).

(2) Register DID and Public Key

The issuer server 1 issues an issuer DID and registers the issuer DID and the DID document 73 on the blockchain. The DID document 73 contains the public key 731 (see FIG. 4).

VC Issuance Phase (3) Enter Attribute Information

The holder starts the wallet application installed on the holder terminal 2. The holder enters his or her attribute information to the wallet application (see FIG. 6). The holder terminal 2 (wallet application) verifies with the holder that the attribute information entered is correct (see FIG. 7). When the holder verifies that the attribute information entered to the holder terminal 2 is correct, the holder terminal 2 saves the entered attribute information (see FIG. 8). This step may be performed with "(1) register DID" described above.

(4) VC Issuance Request

Figure 8:
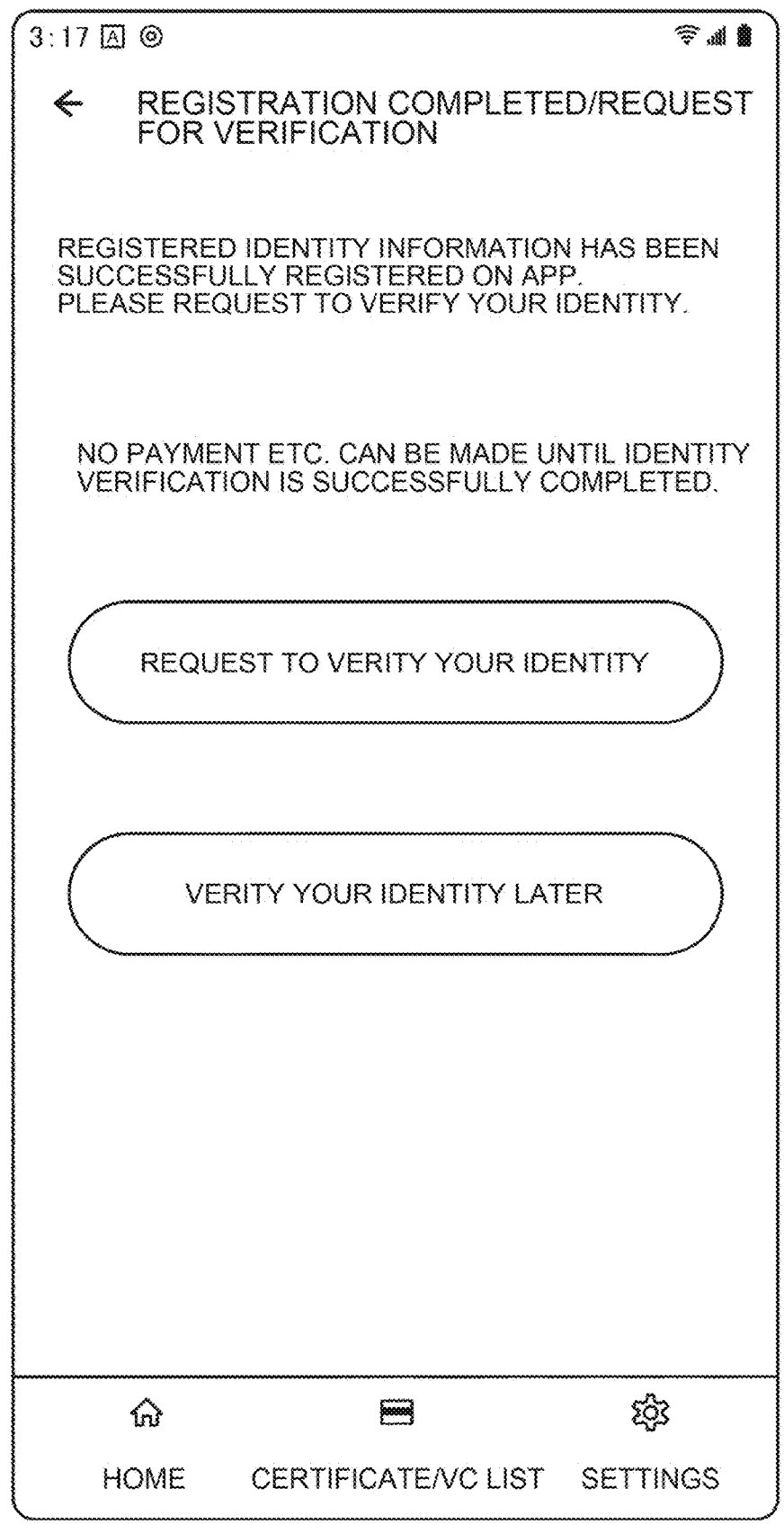
FIG. 8 is a third diagram showing an example of an image displayed on the holder terminal.
Figure 9:
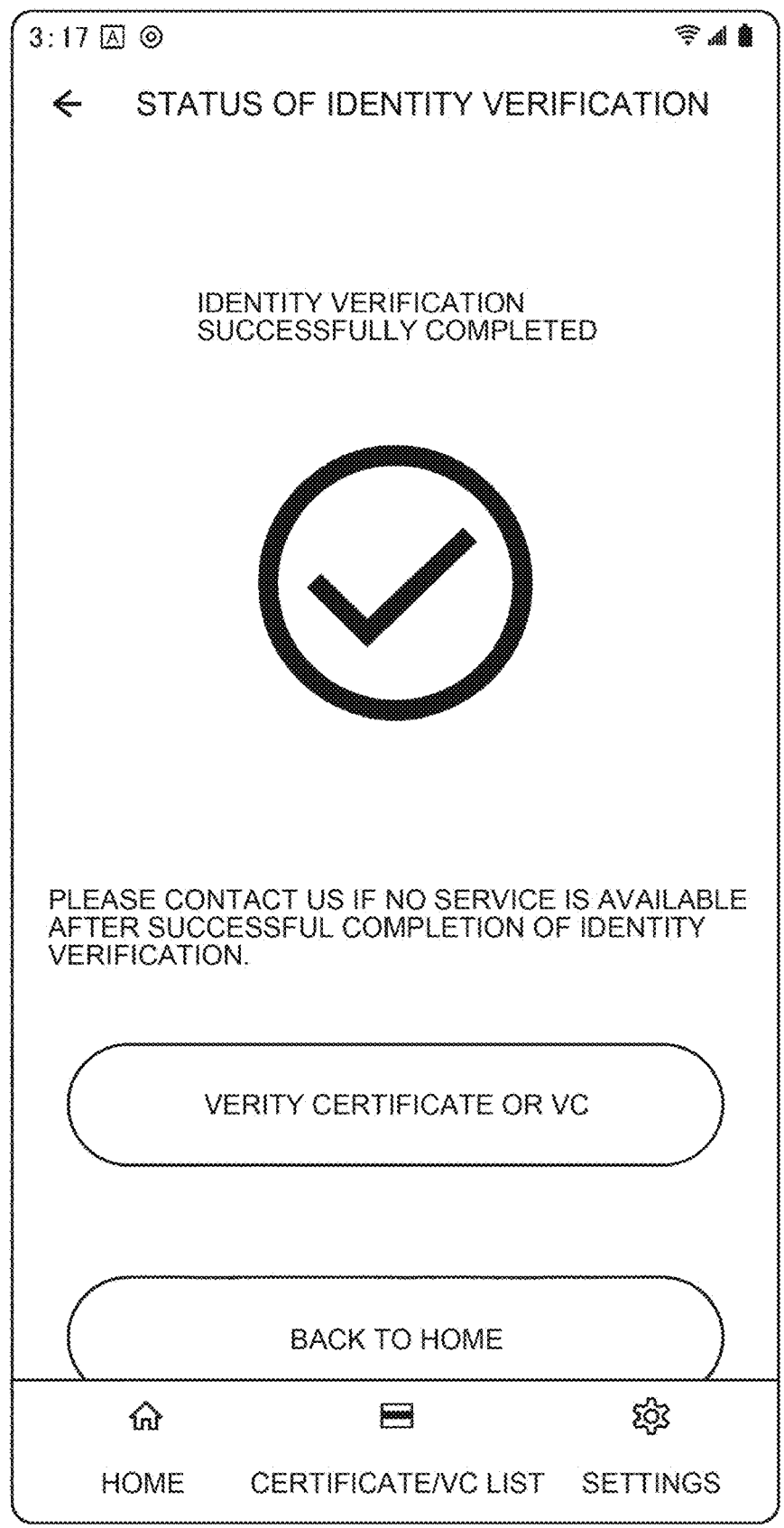
FIG. 9 is a fourth diagram showing an example of an image displayed on the holder terminal.
Figure 10:
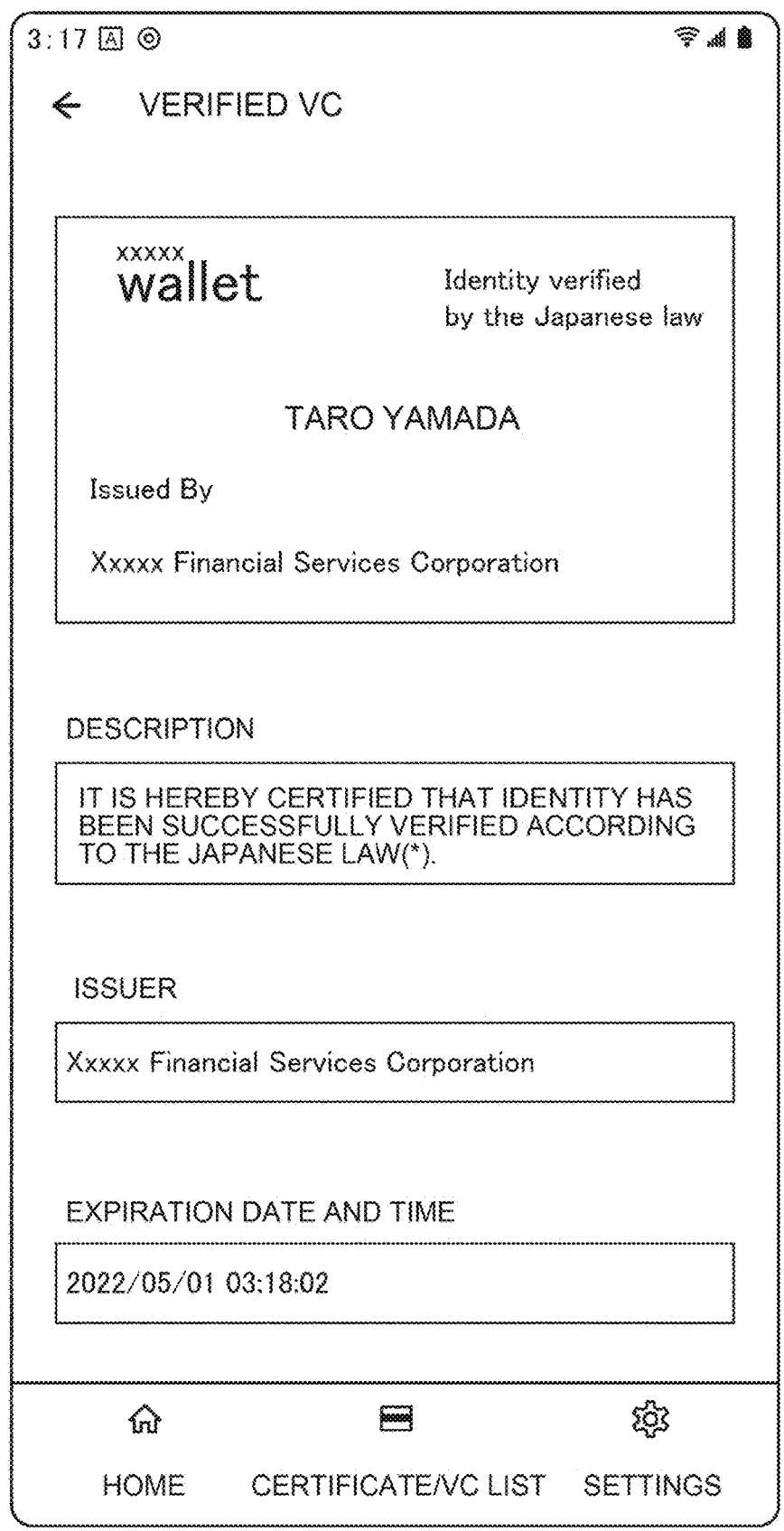
FIG. 10 is a fifth diagram showing an example of an image displayed on the holder terminal.

The holder terminal 2 receives a holder operation requesting issuance of the VC 64 (see FIG. 8). The holder terminal 2 then sends a VC issuance request to the issuer server 1. At this time, information to be issued as the VC 64 (information entered or selected by the holder) out of the holder's attribute information is sent from the holder terminal 2 to the issuer server 1.

(5) KYC

The issuer server 1 performs Know Your Customer (KYC) or electronic Know Your Customer that is an online identity verification procedure.

(6) Issue VC

When the identity verification is successfully completed by KYC, the issuer server 1 issues the VC 64 regarding the attribute information that has been verified to be correct. The holder terminal 2 receives from the issuer server 1 a notification that the identity verification has been successfully completed and that the VC 64 has been issued (see FIG. 9).

(7) Save VC

The holder terminal 2 saves the VC 64 issued by the issuer server 1. The holder can thus view a certificate screen indicating that verification of the holder's attribute information has been successfully completed by the issuer server 1 (identification has been successfully verified) (see FIG. 10).

VC Use Phase (8) Request to Provide Attribute Information

When the holder wants to receive a service from the verifier, the verifier server 3 sends to the holder terminal 2 a request asking the holder to provide his or her attribute information to the verifier (request asking the holder to share his or her attribute information with the verifier). For example, the verifier server 3 sends to the holder terminal 2 a QR code (registered trademark) of a webpage to be accessed by the holder terminal 2.

(9) Present VC

Figure 11:
FIG. 11 is a sixth diagram showing an example of an image displayed on the holder terminal.

The holder terminal 2 reads the QR code received from the verifier server 3 and accesses the webpage linked by the QR code (see FIG. 11). Regulations on handling of personal information (privacy policy) determined by the verifier are thus displayed on the holder terminal 2 (see FIG. 12). The types of attribute information to be provided from the holder to the verifier (attribute information shared between the holder and the verifier) are also displayed on the holder terminal 2 (see FIG. 13). When the holder performs an operation to agree with the verifier's privacy policy and the types of attribute information to be provided to the verifier, the holder terminal 2 presents the VC 64 to the verifier server 3.

(10) Verify VC

The verifier server 3 cryptographically verifies whether the VC 64 presented by the holder is a valid VC issued by the issuer by using the public key 731 of the issuer server 1.

(11) Provide Service

When the validity of the VC 64 is successfully verified, the verifier server 3 notifies the holder terminal 2 that the holder's identity verification has been successfully completed. Information indicating successful completion of the holder's identify verification is thus displayed on the holder terminal 2 (see FIG. 14). The verifier server 3 then starts providing the service to the holder terminal 2.

Setting of Validity Period

In the information management system 100 as described above, it is desirable to reduce the risk of fraudulent use of the VC 64. Therefore, in the present embodiment, the issuer server 1 sets a validity period (or expiration date and time) for the VC 64. The validity period refers to the length of time during which the VC 64 is valid (e.g., one year). The expiration date and time means the end of the time period the VC 64 is valid (e.g., 23:59:59 on December 31).

Hereinafter, the validity period set for the VC 64 is referred to as "VC validity period," and the VC validity period will be described. However, for example, setting a short validity period is equivalent to setting an early expiration date and time. Therefore, the validity period can be replaced with the expiration date and time. The "validity period" according to the present disclosure is a concept including the expiration date and time.

Referring back to FIG. 3, the VC 64 contains an issuer DID (DID 71), an electronic signature 641 generated using the private key 72 of the issuer server 1, and a VC validity period 642. As can be seen from FIG. 3, the VC validity period 642 is associated with the holder DID by being contained in the VC 64.

When the VC validity period 642 expires, the issuer server 1 reissues the VC 64, as will be described in detail below. This allows the electronic signature 641 generated by the latest encryption technology to be contained in the VC 64. The risk of fraudulent use of the VC 64 can thus be reduced.

It is desirable that the issuer server 1 determine, based on the holder's attribute information, which group the holder belongs to out of a plurality of groups determined according to the levels of credibility. In this example, the groups include first to third groups. Holders belonging to the first group have the highest level of credibility. Holders belonging to the second group have the second highest level of credibility. Holders belonging to the third group have the lowest level of credibility. The VC validity period is longer in order from the first group to the third group. That is, the higher the holder's level of credibility, the longer the VC validity period. In other words, the lower the holder's level of credibility, the shorter the VC validity period.

When the holder's level of credibility is low, the VC validity period is set short, so that the time to renew the VC 64 (VC expiration date and time) comes early. When the time to renew the VC 64 comes and the VC 64 is to be reissued, the issuer server 1 can verify the identity of the user again. The risk of fraudulent use of the VC 64 can thus be reduced. When the holder's level of credibility is high, the VC validity period is set long. This can reduce the administrative burden on the issuer server 1 caused by too much verification of the identity of the holder.

Process Flow

Figure 15:
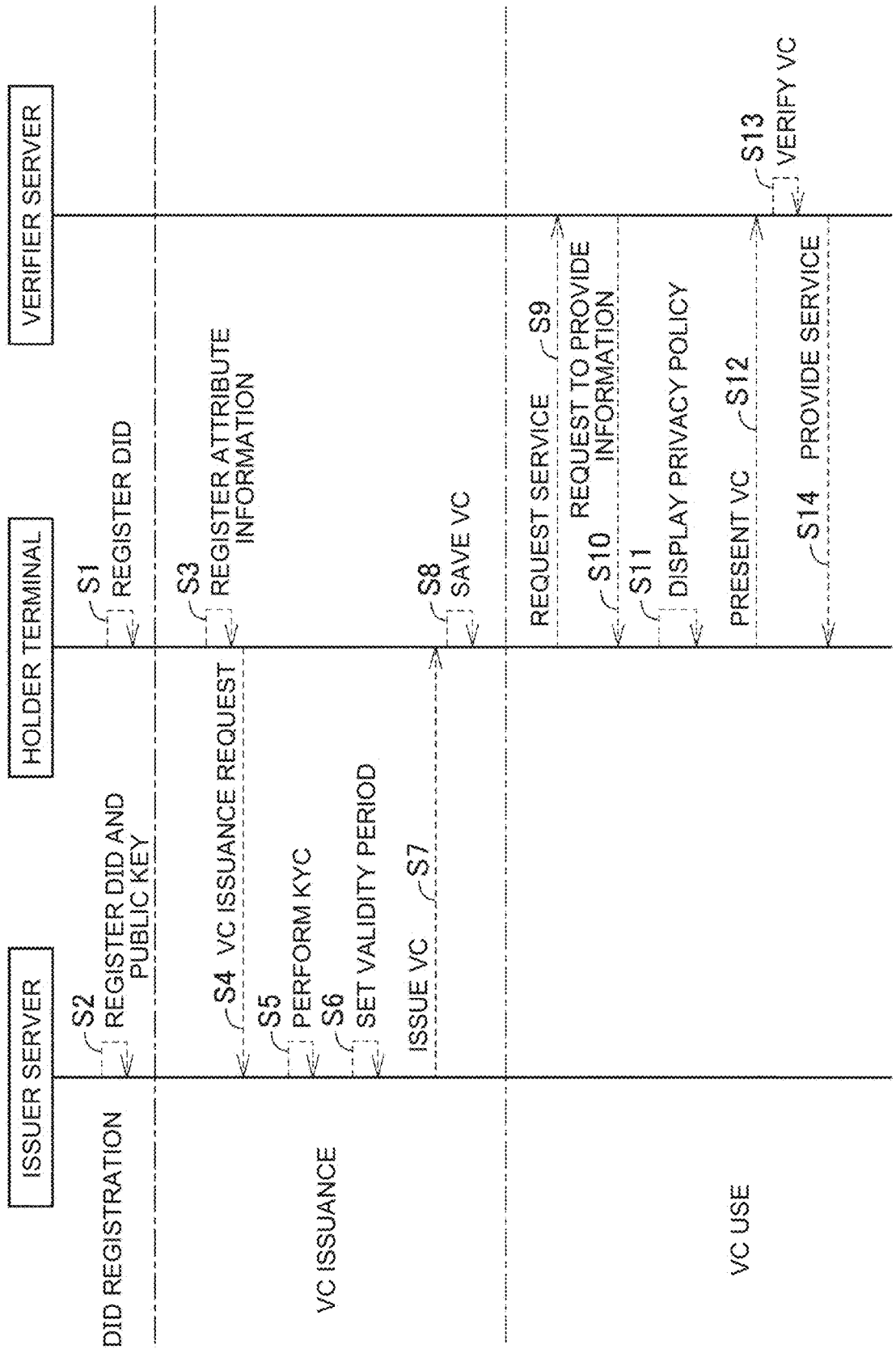
FIG. 15 is a sequence chart showing a process related to the VC according to the embodiment.

FIG. 15 is a sequence chart showing a process related to the VC 64 according to the present embodiment. In the figure, the steps that are performed by the issuer server 1 are shown on the left side, the steps that are performed by the holder terminal 2 (wallet application) are shown in the middle, and the steps that are performed by the verifier server 3 are shown on the right side. The term "step" is hereinafter abbreviated as "S."

DID Registration Phase

In S1, the holder terminal 2 registers the holder DID on the blockchain (one of the nodes 4 forming the blockchain network). In S2, the issuer server 1 registers the issuer DID and the public key 731 on the blockchain. These steps may be performed in advance. The order of these steps is not particularly limited, and may be reversed.

VC Issuance Phase

Figure 6:
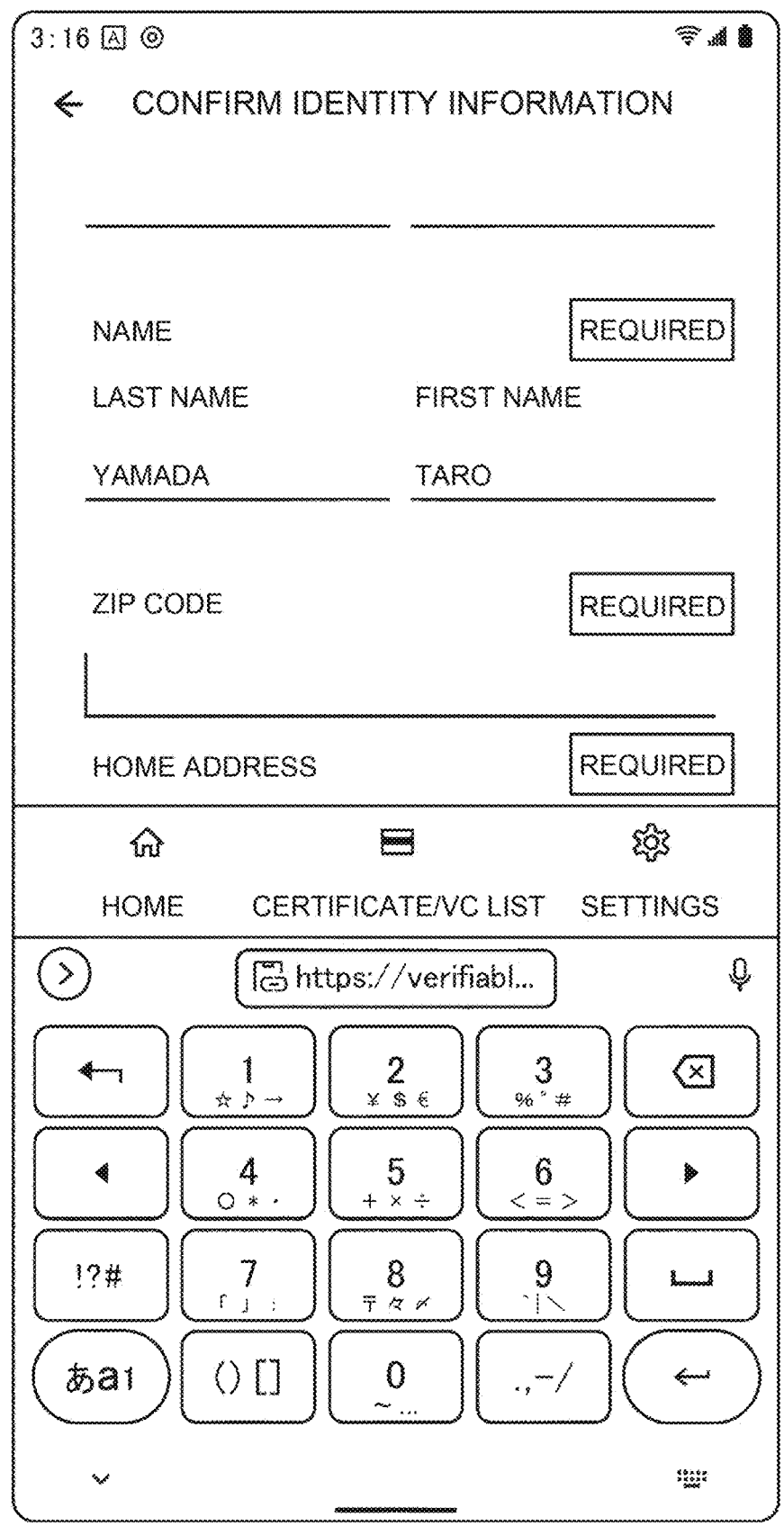
FIG. 6 is a first diagram showing an example of an image displayed on a holder terminal.

In S3, the holder terminal 2 registers the holder's attribute information on the wallet application according to the holder's operation (see FIGS. 6 to 8). This step may also be performed in advance.

In S4, the holder terminal 2 sends a VC issuance request to the issuer server 1 according to the holder's operation. The VC issuance request contains the holder DID and the attribute information (including identity verification document information) entered by the holder.

In S5, the issuer server 1 performs the holder's identity verification procedure (KYC). More specifically, the issuer server 1 checks that the information (name, address, date of birth, etc.) entered by the holder out of the attribute information against the identity verification document information to verify that the attribute information entered by the holder is correct (that is, the holder who made the VC issuance request is the holder himself or herself). The issuer server 1 may use a KYC service provided by an external vendor to perform the identity verification procedure. It is herein assumed that the identity verification of the holder has been successfully completed.

In S6, the issuer server 1 sets the VC validity period based on the holder's attribute information.

Figure 16:
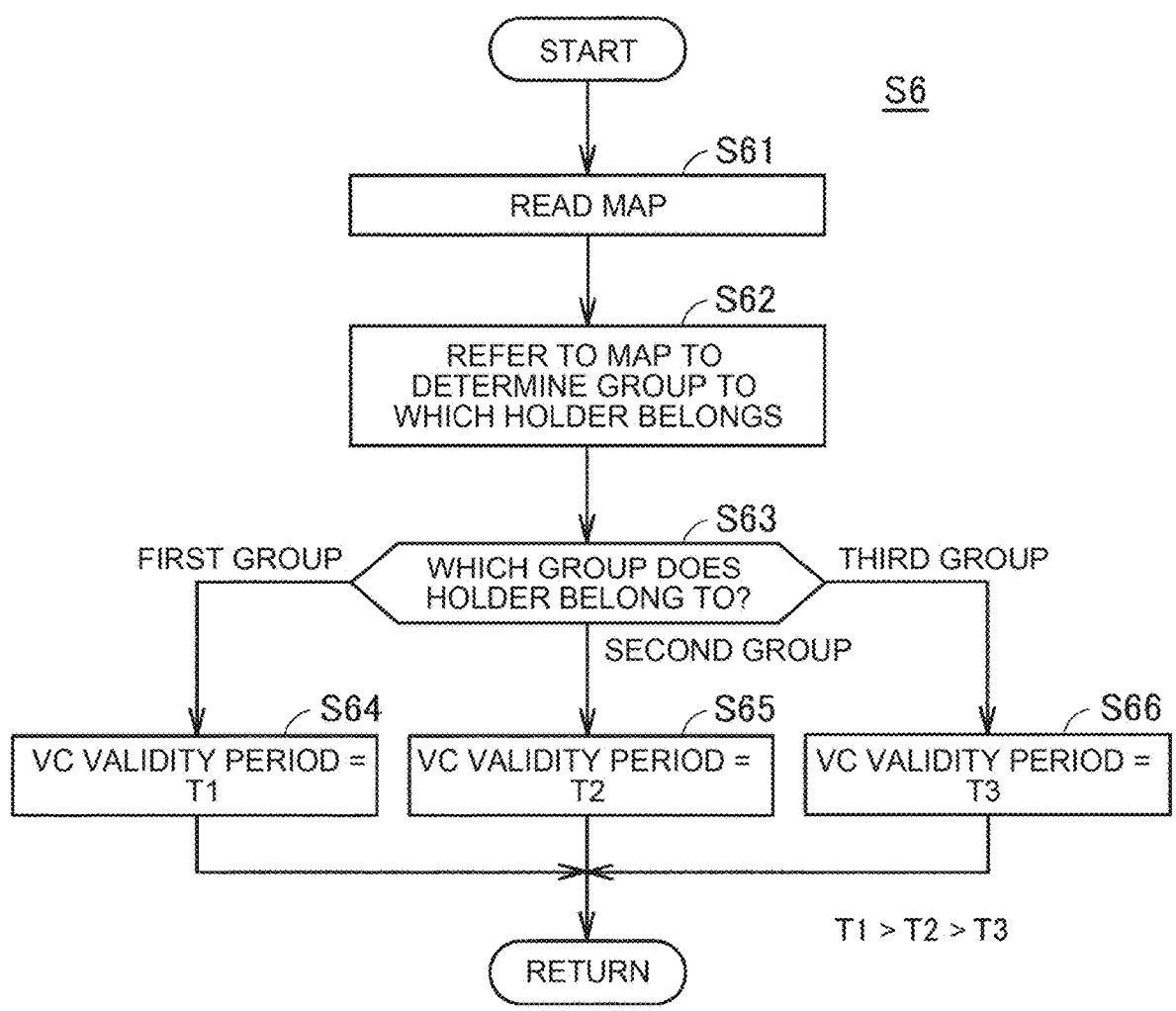
FIG. 16 is a flowchart showing in more detail a process of setting a VC validity period.

FIG. 16 is a flowchart showing in more detail a process of setting the VC validity period (step S6). The process shown in this flowchart is performed by the issuer server 1.

The issuer server 1 has, for example, the credibility level map 54 (see FIG. 2) defining the correspondence between the attribute information and the groups according to the levels of credibility. For example, the credibility level map 54 may be created according to the risk categories in terms of Anti-Money Laundering and Countering the Financing of Terrorism that is commonly carried out in financial institutions. More specifically, financial institutions are legally required to treat customers appropriately according to their risk categories. Therefore, the financial institutions determine customers' risk categories (high risk, medium risk, low risk) based on the customers' attribute information during identity verification at the time of their first transactions. After that, the financial institutions review the customers' risk categories when there is any transaction that affects the customers' risk categories, and also regularly reviews the customers' risk categories (continuous customer management). Creating the credibility level map 54 according to such risk categories allows the issuer to create the credibility level map 54 without additional administrative burden.

The issuer server 1 reads the credibility level map 54 (S61). The issuer server 1 refers to the credibility level map 54 to determine the group to which the holder belongs from the holder's attribute information (S62). The attribute information that can be used as arguments in this example is, for example, age, address, bank account information, nationality, history of overseas residence, and carrier history.

In S63, the issuer server 1 determines which group the holder belongs to out of the first to third groups. When the holder belongs to the first group ("first group" in S63), the issuer server 1 sets the VC validity period to T1 (S64). When the holder belongs to the second group ("second group" in S63), the issuer server 1 sets the VC validity period to T2 (S65). When the holder belongs to the third group ("third group" in S63), the issuer server 1 sets the VC validity period to T3 (S66). In this example, T1>T2>T3.

Referring back to FIG. 15, in S7, the issuer server 1 issues the VC 64 with the VC validity period set in S6. More specifically, the issuer server 1 associates the electronic signature 641 and the VC validity period 642 with the DID document 63 by using the private key 72 corresponding to the public key 731 registered on the blockchain. The issuer server 1 notifies the holder terminal 2 that the identity identification has been successfully completed and that the VC has been issued (see FIG. 9). The holder terminal 2 saves the VC issued by the issuer server 1 in its storage (S8). The holder terminal 2 can thus display a certificate screen (see FIG. 10).

VC Use Phase

In S9, the holder terminal 2 sends to the verifier server 3 a request asking the verifier to provide the service.

In S10, the verifier server 3 requests the holder terminal 2 to provide (share) the holder's attribute information necessary to provide the service. More specifically, the verifier server 3 sends to the holder terminal 2 a link or QR code (registered trademark) of a webpage to be accessed by the holder terminal 2.

Figure 12:
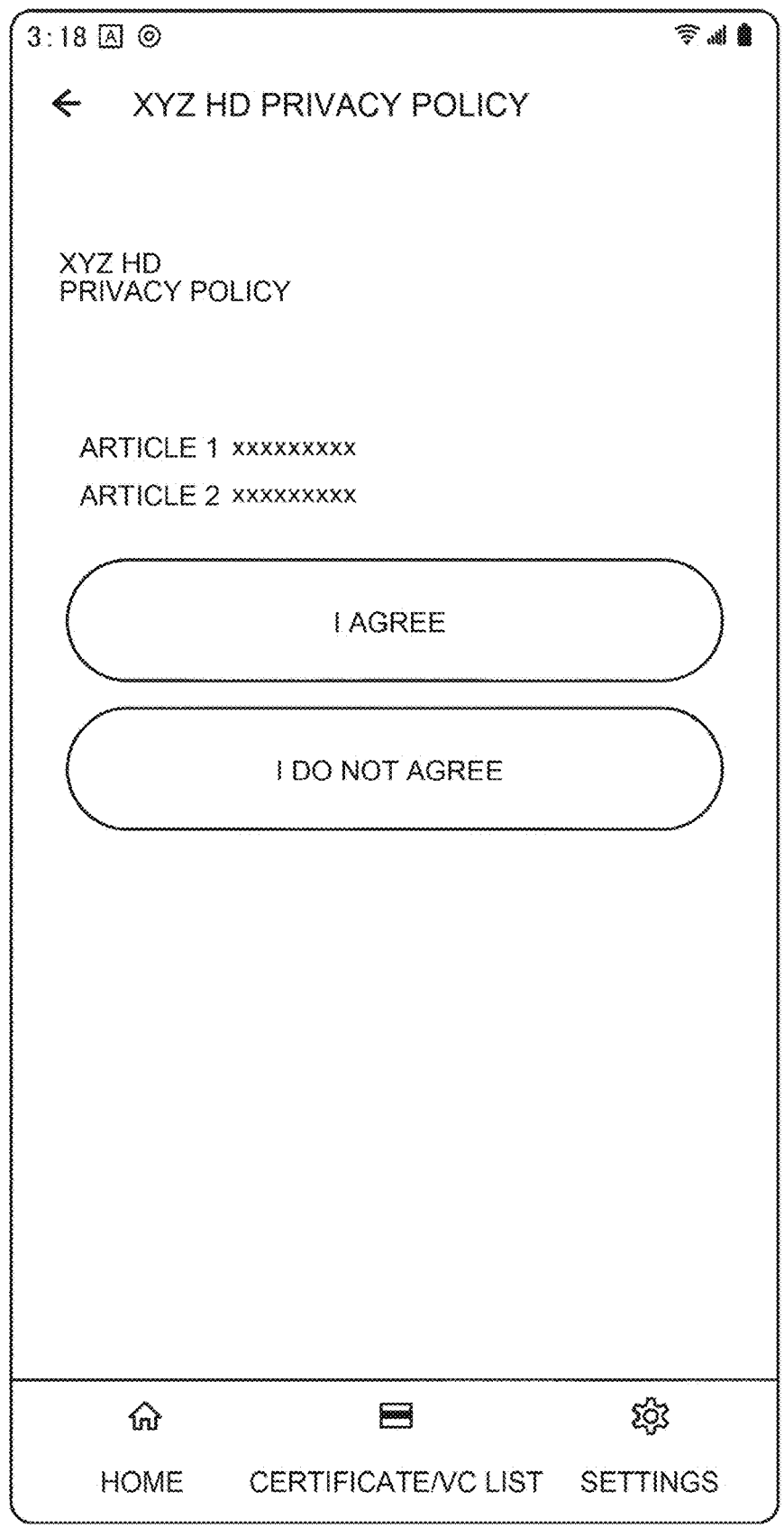
FIG. 12 is a seventh diagram showing an example of an image displayed on the holder terminal.
Figure 13:
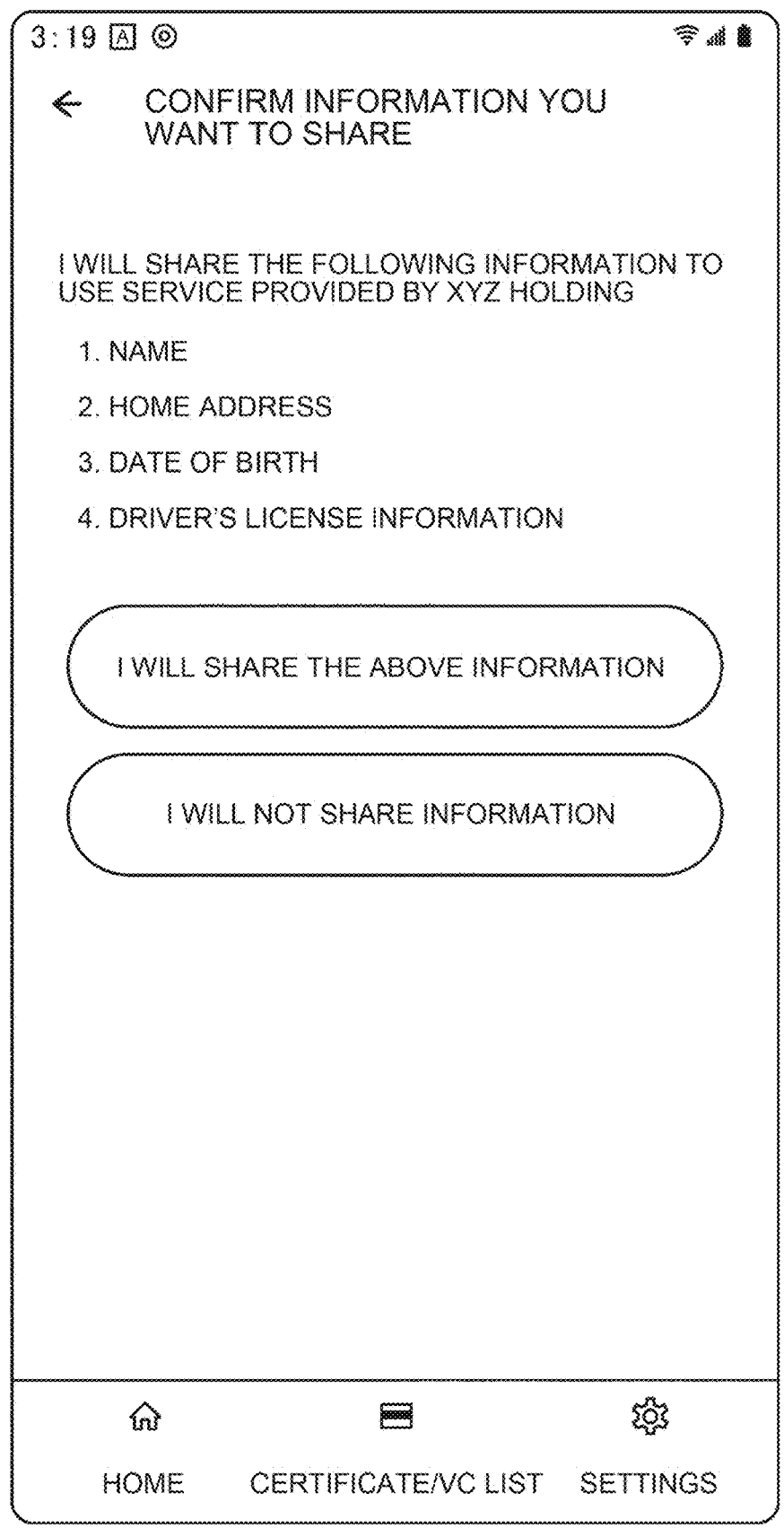
FIG. 13 is an eighth diagram showing an example of an image displayed on the holder terminal.
Figure 14:
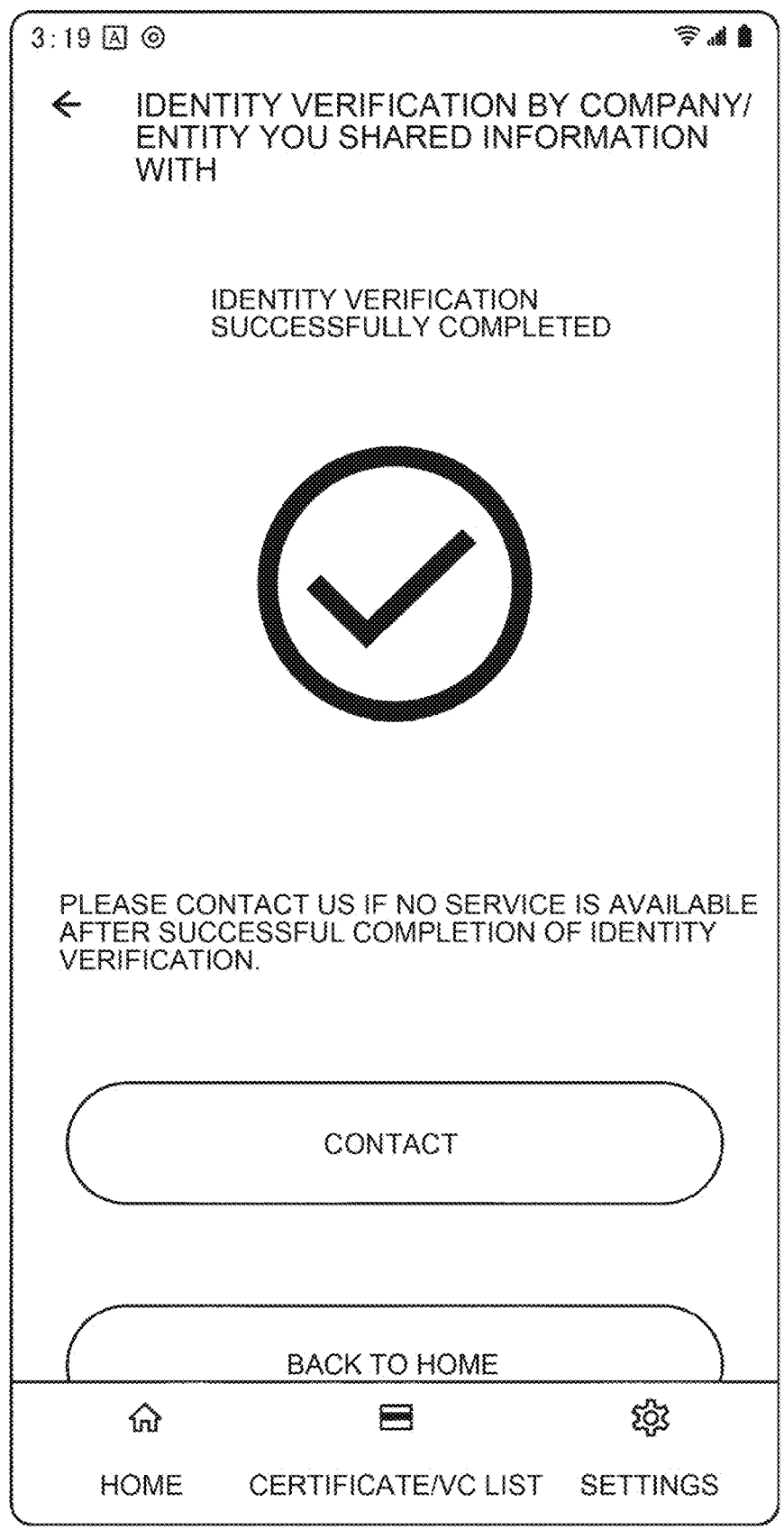
FIG. 14 is a ninth diagram showing an example of an image displayed on the holder terminal.

In S11, the holder terminal 2 reads the QR code (see FIG. 11) received from the verifier server 3, and displays the verifier's privacy policy and the types of attribute information to be provided to the verifier (see FIGS. 12 and 13). When the holder terminal 2 receives the holder's operation indicating that the holder agrees with the displayed contents, the holder terminal 2 presents the VC to the verifier server 3 (S12). More specifically, the holder terminal 2 sends the holder DID with which the VC 64 is associated to the verifier server 3.

In S13, the verifier server 3 verifies the VC presented by the holder terminal 2. More specifically, the verifier server 3 uses the issuer DID contained in the VC 64 as an argument to acquire the DID document 73 from the blockchain (one of the nodes 4 forming the blockchain network). The verifier server 3 thus acquires the issuer's public key 731. The verifier server 3 then decrypts the electronic signature 641 contained in the VC 64 with the issuer's public key 731. When the verification of the VC 64 is successfully completed, the verifier server 3 starts providing the service to the holder terminal 2 (S14).

As described above, in the present embodiment, the validity period (or expiration date and time) is set for the VC 64. When the validity period expires (when the expiration date and time comes), the issuer server 1 reissues (renew) the VC 64 in response to another VC issuance request from the holder terminal 2. This allows the electronic signature 641 generated by the latest encryption technology to be contained in the VC 64. According to the present embodiment, the risk of fraudulent use of the VC 64 can be reduced.

In the present embodiment, the VC validity period is set short when the holder's level of credibility is low. Therefore, the validity period expires early, and the renewal frequency of the VC 64 is increased. When renewing the VC 64, the issuer server 1 can verify the identity of the holder with a low level of credibility again. Accordingly, the risk of fraudulent use of the VC 64 can further be reduced. On the other hand, the VC validity period is set long when the holder's level of credibility is high. This can reduce an excessive increase in renewal frequency of the VC 64 and reduce the administrative burden from verifying the identity of the holder with a high level of credibility.

The embodiment disclosed herein should be considered to be illustrative in all respects and not restrictive. The scope of the present disclosure is set forth by the claims rather than by the above description of the embodiment, and is intended to include all modifications within the meaning and scope equivalent to the claims.

What is claimed is:

1. A server, comprising:
a communication device configured to communicate with a communication terminal of a holder; and
a processor configured to
issue a verifiable credential in response to an issuance request signal received from the communication terminal, the issuance request signal being a signal requesting issuance of the verifiable credential, and containing attribute information of the holder and a first decentralized identifier that is a decentralized identifier of the holder,
set a validity period for the verifiable credential based on the attribute information of the holder, and
associate the set validity period with the first decentralized identifier;
wherein the attribute information contains information entered by the holder and information on an identity verification document of the holder; and
the processor is configured to issue the verifiable credential when identity verification of the holder is successfully completed by checking the information entered by the holder against the information on the identity verification document; and
wherein the processor is configured to determine, based on the attribute information of the holder, which group the holder belongs to out of a plurality of groups with different levels of credibility; and
the processor is configured to set the validity period longer when the holder belongs to the group with a high level of credibility than when the holder belongs to the group with a low level of credibility.

2. An information management system, comprising:
a server configured to
issue a verifiable credential in response to an issuance request signal received from a communication terminal of a holder, the issuance request signal being a signal requesting issuance of the verifiable credential, and containing attribute information of the holder and a first decentralized identifier that is a decentralized identifier of the holder, set a validity period for the verifiable credential based on the attribute information of the holder, and associate the set validity period with the first decentralized identifier; and a verifier server configured to verify the verifiable credential from the communication terminal;

wherein the attribute information contains information entered by the holder and information on an identity verification document of the holder; and the information management system further comprising:

a processor configured to issue the verifiable credential when identity verification of the holder is successfully completed by checking the information entered by the holder against the information on the identity verification document; and wherein:

the processor is configured to determine, based on the attribute information of the holder, which group the holder belongs to out of a plurality of groups with different levels of credibility; and the processor is configured to set the validity period longer when the holder belongs to the group with a high level of credibility than when the holder belongs to the group with a low level of credibility.

3. The information management system according to claim 2, wherein:

the server and the verifier server are configured to access a decentralized ledger network including a decentralized ledger;

the server is configured to register a public key corresponding to a private key on the decentralized ledger;

the verifiable credential contains a second decentralized identifier that is a decentralized identifier of the server and an electronic signature generated using the private key; and the verifier server is configured to, when the verifier server receives the verifiable credential from the communication terminal, acquire the public key from the decentralized ledger based on the second decentralized identifier contained in the verifiable credential, and verify the electronic signature using the public key.

4. An information management method that is performed by a server, the information management method comprising issuing a verifiable credential in response to an issuance request signal received from a communication terminal of a holder, the issuance request signal being a signal requesting issuance of the verifiable credential, and containing attribute information of the holder and a decentralized identifier of the holder, wherein the issuing includes setting a validity period for the verifiable credential based on the attribute information of the holder, and associating the validity period with the decentralized identifier;

wherein the attribute information contains information entered by the holder and information on an identity verification document of the holder;

and the information management method further includes:

issuing the verifiable credential when identity verification of the holder is successfully completed by checking the information entered by the holder against the information on the identity verification document;

determining, based on the attribute information of the holder, which group the holder belongs to out of a plurality of groups with different levels of credibility; and setting the validity period longer when the holder belongs to the group with a high level of credibility than when the holder belongs to the group with a low level of credibility.

* * * * *